(12) United States Patent
Hardacker et al.

(10) Patent No.: US 8,095,955 B2
(45) Date of Patent: Jan. 10, 2012

(54) METHODS AND SYSTEMS FOR IMPROVING NETWORK RESPONSE DURING CHANNEL CHANGE

(75) Inventors: Robert Hardacker, Escondido, CA (US); Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 565 days.

(21) Appl. No.: 12/259,531

(22) Filed: Oct. 28, 2008

(65) Prior Publication Data

US 2010/0104009 A1  Apr. 29, 2010

(51) Int. Cl.
*H04N 7/173* (2011.01)
(52) U.S. Cl. .......................................... 725/95
(58) Field of Classification Search .................. None
See application file for complete search history.

(56) References Cited

U.S. PATENT DOCUMENTS

| | | | |
|---|---|---|---|
| 5,565,920 A * | 10/1996 | Lee et al. | 375/240.11 |
| 5,861,920 A | 1/1999 | Mead et al. | |
| 6,243,495 B1 | 6/2001 | Naveen et al. | |
| 6,981,045 B1 * | 12/2005 | Brooks | 709/226 |
| 7,010,043 B2 | 3/2006 | Kerofsky et al. | |
| 7,571,246 B2 * | 8/2009 | Virdi et al. | 709/232 |
| 2002/0067909 A1 * | 6/2002 | Iivonen | 386/88 |
| 2005/0216948 A1 | 9/2005 | Macinnis | |
| 2006/0026294 A1 | 2/2006 | Virdi et al. | |
| 2006/0140276 A1 * | 6/2006 | Boyce et al. | 375/240.21 |
| 2007/0044123 A1 * | 2/2007 | Zriny et al. | 725/52 |
| 2007/0174880 A1 * | 7/2007 | Fite et al. | 725/87 |
| 2007/0242666 A1 * | 10/2007 | Barrett | 370/389 |
| 2008/0232468 A1 * | 9/2008 | Kwon et al. | 375/240.12 |

FOREIGN PATENT DOCUMENTS

WO   2008041896   4/2008

* cited by examiner

*Primary Examiner* — Brian Pendleton
*Assistant Examiner* — Cai Chen
(74) *Attorney, Agent, or Firm* — John L. Rogitz

(57) ABSTRACT

In response to a channel change command in a home network, to reduce latency a real time network bandwidth determination is made and if the determination indicates that bandwidth is sufficient to support only I-frame transmission, then only I-frames are sent temporarily from the source to the sink. Otherwise, I and P frames only are sent and may be encoded at a faster than normal frame rate and displayed at a lower than normal frame rate. If the sink is not configured for non-standard groups of pictures (GOP) some of the P frames can be indicated to the sink as being B-frames.

14 Claims, 2 Drawing Sheets

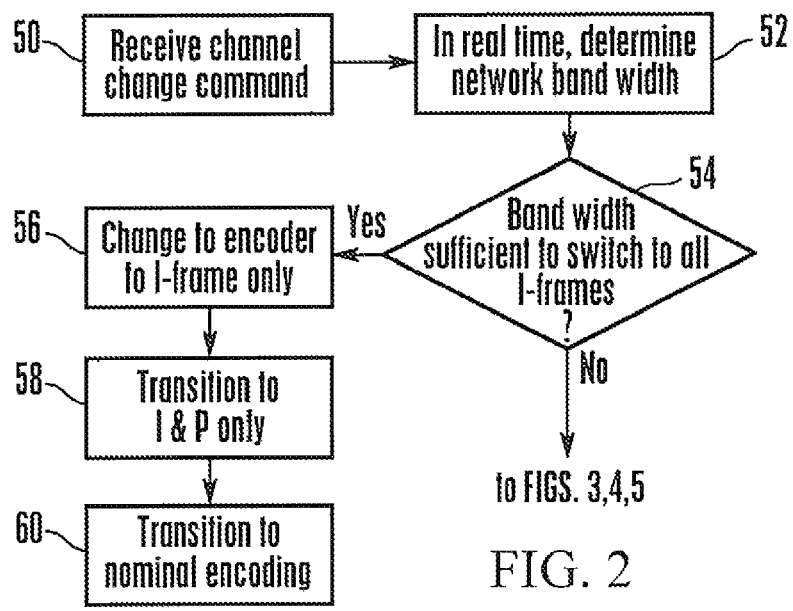
FIG. 2
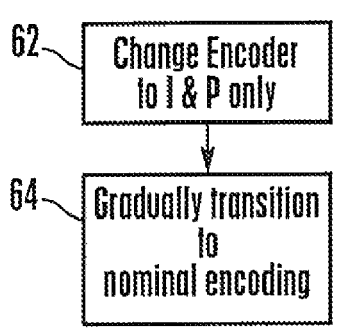
FIG. 3
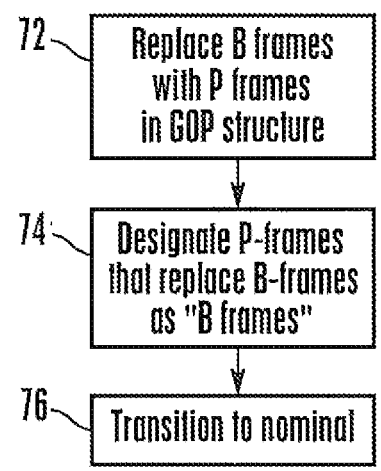
FIG. 4
FIG. 5

METHODS AND SYSTEMS FOR IMPROVING NETWORK RESPONSE DURING CHANNEL CHANGE

FIELD OF THE INVENTION

The present invention relates to improving network response particularly in home networks during channel changes.

BACKGROUND OF THE INVENTION

In video transmission, video is conveyed in a series of individual still images referred to as "frames". To conserve bandwidth, real-time (RT) compression techniques are used, including Advanced Video Coding, MPEG-2, etc. Such techniques typically use multiple types of frames arranged in "groups of pictures" (GOP). Intracoded frames, or I-frames, essentially are complete individual images that do not refer to other frames, and typically a GOP begins with an I-frame. Because they are more or less complete images, I-frames embody a relatively large amount data. As a means of compression, predicted frames ("P-frames") may follow an I-frame in a GOP. P-frames are referenced to prior frames and embody less data then I-frames, while bi-predictive frames ("B-frames") in a GOP are referenced to prior frames and also require calculations related to predicted positions of moving objects. A typical GOP sequence by frame type may be I-B-B-P-B-B-P-B-B or longer.

SUMMARY OF THE INVENTION

As recognized herein, when transmitting content in home networks and employing real-time (RT) compression codecs such as those noted above, there is often significant latency when trying to achieve the best quality at the lowest bit-rates. With more specificity, while beneficial from a standpoint of efficiency, video compression has the undesirable side effect of producing relatively longer latencies during channel changing compared with less efficient coding methods such as I-frame only (which can easily double the bit-rate requirements). Often networks cannot sustain the higher bit-rates of I-frames only without degrading another network user's experience. This latency is unnoticeable while watching a program but disconcerting at channel change time, causing delays of many seconds.

Accordingly, a method includes detecting a latency-implicating event such as a channel change command in a home network. In response to the latency-implicating event, a bandwidth between a source and a sink is determined in real time and if the bandwidth is sufficiently large, only I-frames of video are sent from the source to the sink. On the other hand, if the bandwidth is not sufficiently large, video other than only I-frames which are encoded at a nominal resolution is sent from the source to the sink. The method preferably includes transitioning back to sending I, P, and B frames in a group of pictures (GOP).

By way of illustration and not limitation, if the bandwidth is not sufficiently large, only I and P frames are sent from the source to the sink. Or, if the bandwidth is not sufficiently large, only I and P frames are sent from the source to the sink and some of the P frames are indicated by the source to be B frames so that a sink expecting only conventional GOP structure may be used. Still again, if the bandwidth is not sufficiently large, only I-frames encoded using a reduced quantizer or further sub-sampled chrominance or dropping of lowest order pixel bits than the nominal resolution are sent from the source to the sink.

In the absence of the latency-implicating event, frames are displayed at the sink at a nominal rate. In some embodiments frames can be displayed at a rate slower than the nominal rate in response to a latency-implicating events.

In the absence of the latency-implicating event frames are encoded at the source at a nominal rate. In some embodiments frames are encoded at a rate faster than the nominal rate in response to the latency-implicating event.

In another aspect, a source of audio-video data for a home network is configured to send, to a sink, video in groups of pictures (GOP) including I, P, and B frames. Each GOP is encoded at a nominal rate. In response to a latency-implicating event, the source is configured to send, to the sink, only I frames if a real time bandwidth determination indicates that sufficient bandwidth is available, and otherwise the source is configured to temporarily alter each GOP to include only I and P frames, and/or to temporarily alter each GOP to include only I and P frames while indicating to the sink that some of the P frames are B frames, and/or to temporarily encode each GOP at a rate faster than the nominal rate.

In another aspect, a sink of audio-video data for a home network is configured to receive, from a source, video in groups of pictures (GOP) including I, P, and B frames, with each GOP being presented by the sink at a nominal rate. In response to a latency-implicating event, the sink is configured to display GOP received from the source at a rate slower than the nominal rate.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart showing example initial logic; and

FIGS. 3-5 are flow charts showing example logic when network bandwidth is not sufficient to support the transmission of only I-frames during channel change.

DETAILED DESCRIPTION OF THE PREFERRED EMBODIMENT

Figure 1:
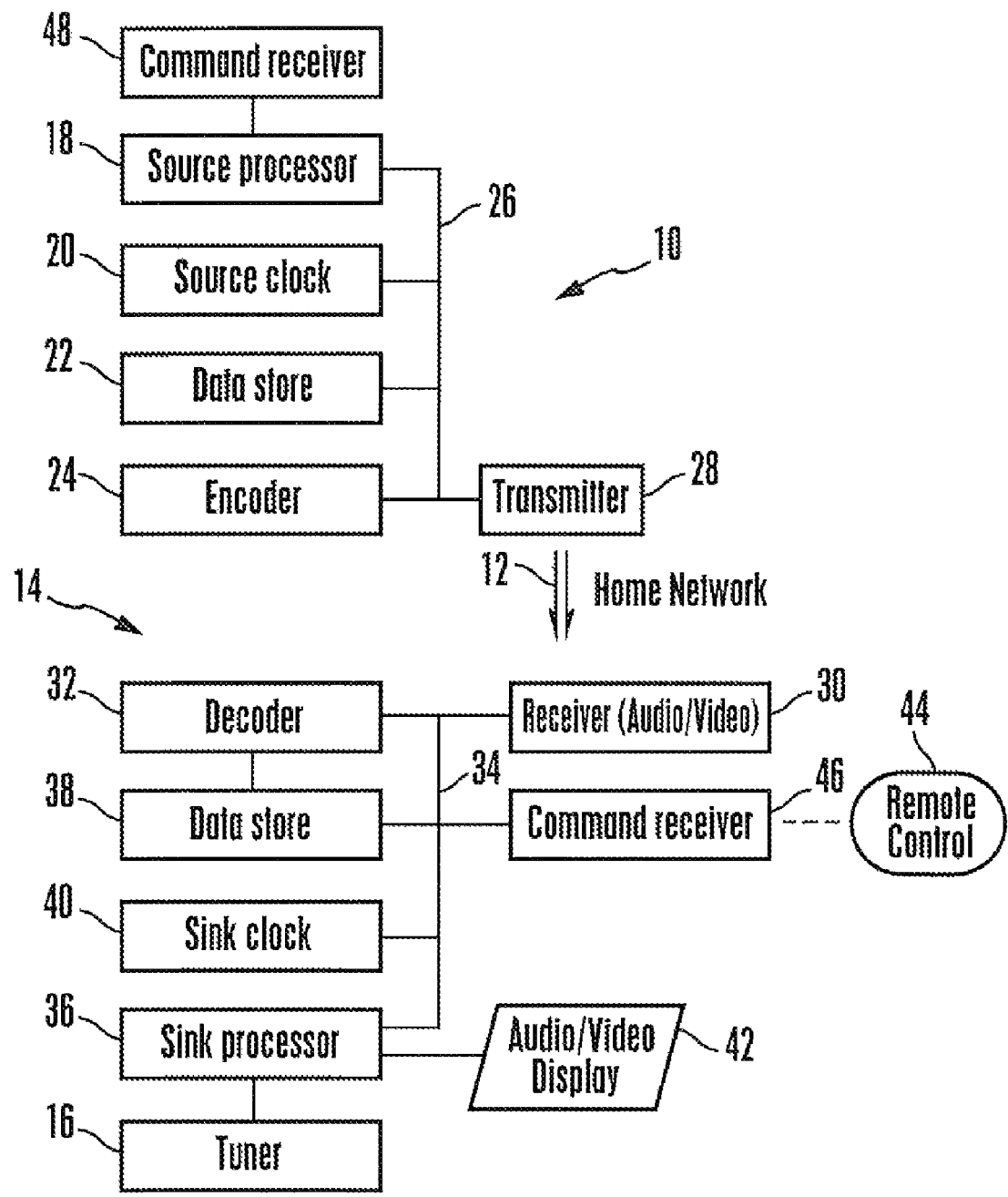
FIG. 1 is a block diagram of an example system in accordance with present principles.

Referring initially to FIG. I, a source 10 of audio-video data can communicate the date over a home network 12 to a sink 14. The source 10 may be, without limitation, an AV server computer, a set-top box, a disk player, or other source of AV content. The home network 12 may be, without limitation, a wired or wireless home network, a power line network, etc. The sink 14 may be, without limitation, a TV in which case the sink 14 may include a TV tuner 16, it being understood that in some embodiments the tuner 16 may be included in a set-top box.

In the example embodiment shown, the source 10 can include a source processor 18, a source clock 20, and a data store 22 such as solid state storage, disk storage, a combination thereof, etc. The source 10 also typically includes a video encoder 24 such as but not limited to an AVC encoder, MPEG-2 encoder, etc. The source components may communicate on a source bus 26 under control of the source processor 18. Parts of the logic below may be implemented as computer-readable code on the data store 22, which may be implemented by a suitable computer-readable medium such as any of those mentioned above, for execution of the code by the source processor 18. Data from the encoder 24 may be provided to a transmitter 28 which may be implemented by a suitable communications interface to the network 12.

At the sink, a receiver 30 may receive data from the home network 12. The receiver 30 may be implemented by a suitable communications interface to the network 12. Information from the receiver 30 may be decoded by a decoder communicating on a sink bus 34. Other components that may communicate on the sink bus 34 under control of a sink processor 36 may include, in addition to the sink processor 36, a sink data store 38 and a sink clock 40. The sink processor 36 may cause AV data to be displayed on an AV display 42, which may include a video monitor and/or audio speakers.

System commands such as but not limited to channel change commands may be received from a hand-held portable remote control 44 by a command receiver 46 of the sink 14, for processing of the commands by the sink processor 36. If desired, the source 10 may be provided with a command receiver 48 for processing of the commands by the source processor 18. Parts of the logic below may be implemented as computer-readable code on the sink data store 38, which may be implemented by a suitable computer-readable medium such as any of those mentioned above, for execution of the code by the sink processor 36.

Now referring to FIG. 2 and commencing at block 50, a latency-implicating event such as, in an example embodiment, the reception of a channel change command occurs. The channel change command may be detected by both the source and sink or it may be detected by one of them and communicated to the other.

Moving to block 52, a bandwidth determination is made in real time in response to the channel change command, typically the bandwidth of all of the network 12 or at least the part of the network 12 connecting the source 10 to the sink 14. The bandwidth determination may be made by either or both of the source processor 18 and sink processor 36. If desired, buffers in the sink 14 may be of any remaining data. It is to be understood that block 52 may be executed more or less continuously, i.e., that bandwidth is constantly monitored for In making the bandwidth determination, one or more factors may be considered. For example, among the factors that may be considered to determine network bandwidth requirements are delta quantization and measurement of Motion Vector lengths. Maximum bandwidth can be known based on signal strength (a function if distance, transmit power, receiver amplification, and channel conditions) which in turn can determine modulation, which defines bits per second. Furthermore, if a channel is being time-shared, real-time streaming typically is given higher priority over file sharing/transfer.

Proceeding to decision diamond 54 it is determined whether the current (real time) network bandwidth supports sending only I frames, encoded at their nominal resolution and rate, to the sink. This is done by comparing the amount of data known to be in each I frame at the nominal resolution and rate for the system to the bandwidth. If insufficient bandwidth exists, the logic may implement one or more of the alternatives shown in FIGS. 3-5 and described below, but otherwise the logic moves to block 56 to change the encoder 24 to transmit only I-frames, encoded at the nominal rate and resolution, to the sink.

At block 58, gradually (e.g., over the space of just a few seconds) the encoding scheme is changed to one that which is more efficient, e.g., from all I frames to I and P frames only. Preferably, this change is done relatively slowly, gradually increasing the latency such that a viewer of the sink display will be unable to detect it. Thus, the encoder transitions from encoding only f frames to encoding I and P frames, building new GOP structures, and extending the GOP structures to decrease the bit-rate. Eventually (e.g., after a few seconds), nominal encoding including implementing I, P, and B frames at the nominal rate and resolution is resumed at block 60.

If desired, a modified process may be employed to further facilitate the logic of blocks 56-60 or indeed as a standalone alternative to FIGS. 3-5 in the event of a negative test result at decision diamond 54, namely, by increasing the encoding rate of the encoder 24 by manipulating the source clock 24 as appropriate to encode and transmit frames at a faster than nominal rate. For example, instead of encoding at 29.97 frames per second, encoding could occur at 30.5 frames per second with appropriate presentation stamps. In some embodiments a frame's time stamp is delayed, respective to a real time clock by the source (encoder) such that the sink (decoder), while trying to synchronize its clock to the incoming stream, is forced to retard (slow down) the presentation of frames, resulting in frames that are presented for a timer period that is somewhat longer than normal, i.e., a reduced frame rate presentation.

As yet another method of time-shifting the latency, periodic duplicate frames may be inserted into the stream until the nominal GOP structure is achieved.

Now referring to FIG. 3, in the event of insufficient bandwidth at decision diamond 54, at block 62 the encoder 24 is changed to provide in each GOP I and P frames only, omitting the B frames, which take longer to calculate. At block 64 encoding is gradually transitioned back to nominal as described above.

In another alternative that may be used in lieu of or in addition to FIG. 3, at block 66 in FIG. 4 the quantizer of the encoder 24 is reduced to lower the video resolution (and, hence, among of data to be transmitted). At block 68 only I-frames may be encoded, at the lower resolution, and then gradually the quantizer resolution can be increased at block 70 back to nominal in accordance with principles above. If the encoder reduces the resolution, the sink can scale it back up. For example, if every other line of a 1920×1080 image is dropped to produce a 1920×540 image at the encoder, the sink scales it back up by inserting duplicate lines or interpolated lines, i.e., lines that contain pixel values which are interpolated between the values of adjacent lines.

Still again, at block 72 of FIG. 5 for sinks that do not expect GOP structure to deviate from a standard or to simplify the process, in effect B frames are transparently replaced by P frames as follows. At block 74 I and P frames only are generated but the P frames that occupy the positions in the GOP that normally would be occupied by B frames are simply designated by the source to be "B frames".

The above optimizations may be empirically determined for the particular network topology being used.

In addition to or in lieu of the above, at the sink, in response to the channel change command, the sink processor 36 can control the sink clock 40 as appropriate to cause the video to be displayed at a slightly slower rate than nominal, so that data remains available in the sink buffer and latency is imperceptible. For example, the display rate can be slowed from 29.97 frames per second to only 29 frames per second. Any one of multiple methods to slow down the display rate may be used. For example, the sink clock 40 can be slowed, or a null packet P frame can be sent immediately following the first I frame which forces the replay of the same I frame twice, or the same P frame can be sent multiple times. In both of the latter cases processing time at the source is reduced so that data starting with an I-frame that requires no reference to any other frame can be more quickly sent to the sink, avoiding the appearance of latency.

Still further, in addition to or in lieu of the above low order pixel bits temporarily may be eliminated from the frames sent during channel change. For example, a common size pixel is twenty four bits with eight for red, eight for green, and eight for blue (RGB pixel). If the pixel bits are arrayed with bit 7 being the higher order bit and bit 0 being the low order bit, bit 0 (and if desired depending on bandwidth bit 1 and so on) can be eliminated from each color in the pixel in frames sent during channel change.

The same principle may be applied to eliminating certain chrominance information, with chrominance being in effect an encoded version of RGB. Specifically, the information in a frame sent during channel change can be reduced by reducing the sampling rate for chrominance generation, e.g., instead of sampling at a rate that would produce twenty four bits per pixel, chrominance may be sampled at a rate that produces only sixteen bits per pixel. Other reduced chrominance sampling may be used.

As understood herein, a mix of the above methods may be dynamically chosen based on, e.g., motion vectors, current resolution, available bandwidth, etc. For example, if one method for reducing data transmission during channel change is known to be less effective in scenes with high motion as indicated by the motion vectors, and a scene during channel change is detected to have motion vectors indicating motion greater than a threshold, the method would not be used and another of the above methods would be used instead. Likewise, solid color fields might look worse if the reduced sampling of chrominance is used if subtle shading differences are part of the image.

While the particular METHODS AND SYSTEMS FOR IMPROVING NETWORK RESPONSE DURING CHANNEL CHANGE is herein shown and described in detail, it is to be understood that the subject matter which is encompassed by the present invention is limited only by the claims.

What is claimed is:

1. Method comprising:
receiving a channel change signal;
responsive to receiving the channel change signal, determining a real time data bandwidth between at least a source and a sink in the network;
responsive to a determination that the real time bandwidth is at least as large as a threshold bandwidth, sending only I-frames of video from the source to the sink for display of the video at the sink; the I-frames defining a nominal resolution, the I-frames being sent at the nominal resolution;
responsive to a determination that the real time bandwidth is not as large as the threshold bandwidth, sending video other than only I-frames that are encoded at the nominal resolution from the source to the sink for display of the video at the sink.

2. The method of claim 1, comprising transitioning back to sending I, P, and B frames in a group of pictures (GOP).

3. The method of claim 1, wherein if the bandwidth is not as large as a threshold bandwidth, only I and P frames are sent from the source to the sink.

4. The method of claim 1, wherein if the bandwidth is not as large as a threshold bandwidth, only I and P frames are sent from the source to the sink, at least some of the P frames indicated by the source to be B frames.

5. The method of claim 1, wherein if the bandwidth is not as large as a threshold bandwidth, only I-frames encoded using a reduced quantizer and/or sub-sampled chrominance and/or dropping of lowest order pixel bits than the nominal resolution are sent from the source to the sink.

6. The method of claim 1, wherein in the absence of the channel change signal frames are displayed at the sink at a nominal rate, and the method comprises displaying frames at a rate slower than the nominal rate in response to at least some latency-implicating events.

7. The method of claim 1, wherein in the absence of the channel change signal frames are encoded at the source at a nominal rate, and the method comprises encoding frames at a rate faster than the nominal rate in response to at least some latency-implicating events.

8. Source of audio-video data for a home network, the source being configured to:
send, to a sink, video in groups of pictures (GOP) comprising I, P, and B frames, each GOP being encoded at a nominal rate;
in response to a determination that a bandwidth that is at least equal to a threshold bandwidth is available for sending information from the source of audio-video data for the home network, send, to the sink, only I frames, and otherwise execute at least one act selected from the group of acts consisting of:
temporarily alter each GOP to include only I and P frames;
temporarily alter each GOP to include only I and P frames while indicating to the sink that some of the P frames are B frames; and
temporarily encode each GOP at a rate faster than the nominal rate.

9. The source of claim 8, wherein the determination that a bandwidth that is at least equal to a threshold bandwidth is available for sending information from the source of audio-video data for the home network is executed responsive to a latency-implicating event.

10. The source of claim 8, wherein the source is configured to encode I-frames at a resolution less than a nominal resolution.

11. The source of claim 8, wherein if the bandwidth determination does not indicate that a threshold bandwidth is available, the source is configured to temporarily alter each GOP to include only I and P frames and to temporarily encode each GOP at a rate faster than the nominal rate.

12. The source of claim 10, wherein if the bandwidth determination does not indicate that a threshold bandwidth is available, the source is configured to temporarily alter each GOP to include only I and P frames and to temporarily encode each GOP at a rate faster than the nominal rate.

13. The source of claim 9, wherein the source is configured to resume sending to the sink video in groups of pictures (GOP) comprising I, P, and B frames at the nominal rate at the elapse of the latency-implicating event.

14. The source of claim 10, wherein the sink scales up received low resolution frames to the nominal resolution.

* * * * *